3,419,513
THERMOPLASTIC RESINS PLASTICIZED WITH ESTERS OF TRICYCLO-(4,2,2,0$^{2,5}$) - DEC-7-ENE-3,4,9,10-TETRACARBOXYLIC ACIDS
Dale R. Dill, Webster Groves, Mo., assignor to Monsanto Company, St. Louis, Mo., a corporation of Delaware
No Drawing. Filed Oct. 18, 1967, Ser. No. 676,086
9 Claims. (Cl. 260—31.8)

ABSTRACT OF THE DISCLOSURE

This invention relates to the use of esters of tricyclo-(4,2,2,0$^{2,5}$)-dec-7-ene-3,4,9,10-tetracarboxylic acid dianhydride as plasticizers for thermoplastic resins.

---

This invention relates to new and useful thermoplastic resinous compositions. In particular, this invention relates to new and improved thermoplastic resinous compositions containing certain esters of tricyclo-(4,2,2,0$^{2,5}$)-dec-7-ene-3,4,9,10-tetracarboxylic acid dianhydride which specifically improve the physical properties of the starting resin.

Normally, vinyl halide polymers such as polyvinyl chloride and copolymers thereof, which are widely employed in the plastics industry, are quite hard and brittle in nature and require the addition of substantial proportions of a plasticizer to improve their workability. Since some of the plasticizer is ordinarily retained in the plastic product, it is desirable that it possess certain characteristics. Among these desirable characteristics is the ability of a plasticizer to impart low-temperature flexibility to the product. The plasticizer must also be of low volatility to prevent its loss by evaporation. Other desirable characteristics of a plasticizer include low water absorption and leaching. It is also desirable that the plasticizer be one which does not allow the finished product to become hard and brittle and thereby easily fractured.

It is accordingly an object of this invention to provide improved thermoplastic resinous compositions.

It is a further object of this invention to provide novel plastic compositions comprising thermoplastic resins and certain esters of tricyclo-(4,2,2,0$^{2,5}$)-dec-7-ene-3,4,9,10-tetracarboxylic acid dianhydride.

A still further object is to provide new resinous compositions having desirable physical properties.

Other objects and advantages of the invention will now be apparent to those skilled in the art from the following detailed description and claims.

In accordance with this invention, it has been found that the above and still further objects are achieved by incorporating a thermoplastic resin and certain esters of tricyclo-(4,2,2,0$^{2,5}$)-dec-7-ene-3,4,9,10-tetracarboxylic acid dianhydride.

Generally speaking, about 5 to 200 parts by weight of plasticizer can be used for each 100 parts by weight of thermoplastic resin. However, it is preferred to use from about 20 to 100 parts by weight of plasticizer per 100 parts by weight of resin.

The esters of this invention are effective as plasticizers for thermoplastic resins and rubber-like materials. Examples of materials suitable for use with this invention include vinyl chloride polymers or copolymers, polyvinyl acetate, cellulose ethers such as ethyl cellulose, cellulose esters of organic acids having 2 to 4 carbon atoms such as cellulose acetate, cellulose propionate, cellulose butyrate, cellulose acetate-butyrate and cellulose acetate-propionate, vinyl aromatic resins such as polystyrene, rubbery polymers such as the copolymers of butadiene with styrene or acrylontrile and the terpolymer of acrylonitrile, butadiene and styrene, and polymers of α-monoolefins having 2 to 10 carbon atoms such as the polymers and copolymers of ethylene, propylene, butene-1 and the like. Also suitable for use with this invention are polymers of methyl methacrylate, which can be either homopolymers of methyl methacrylate or copolymers with minor amounts, for example, up to 25% by weight, of another ethylenically unsaturated monomer copolymerizable therewith, for example, acrylic acid, methacrylic acid, the 1 to 4 carbon alkyl (i.e., methyl to butyl) esters of acrylic acid, the 2 to 4 carbon alkyl (i.e., ethyl, propyl and butyl) esters of methacrylic acid, vinyl acetate, acrylonitrile, various amides and styrene.

This invention is particularly applicable to halogen-containing vinyl resins such as polymerized vinyl chloride resins and to resins formed by the conjoint polymerization of vinyl chloride with other materials such as vinyl acetate, vinyl propionate, vinylidene chloride, methyl methacrylate or diethylmaleate.

The halogen-containing resins of this invention are those derived from such vinyl compounds as vinyl chloride, vinyl chloroacetate, chlorostyrene, chlorobutadienes, etc. Said resins also include the copolymers of such vinyl compounds and other ethylenically unsaturated monomers copolymerizable therewith. Illustrative are the copolymers of a vinyl halide, such as vinyl chloride, with other monomers such as vinylidene chloride; vinyl esters of carboxylic acids, e.g., vinyl acetate, vinyl propionate, vinyl butyrate, vinyl benzoate; esters of unsaturated acids, e.g., alkyl acrylates such as methyl acrylate, ethyl acrylate, propyl acrylate, butyl acrylate, allyl acrylate, and the corresponding esters of methacrylic acid; vinyl aromatic compounds, e.g., styrene ortho-chlorostyrene, para-chlorostyrene, 2,5-dichlorostyrene, 2,4-dichlorostyrene, para-ethyl styrene, vinyl naphthalene, α-methyl styrene, dienes such as butadiene and chlorobutadiene; unsaturated amides such as acrylic acid amide and acrylic acid anilide; unsaturated nitriles such as acrylic acid nitrile; esters of α,β-unsaturated carboxylic acids, e.g., the methyl, ethyl, propyl, butyl, amyl, hexyl, heptyl, octyl, allyl, metallyl and phenyl esters of maleic, crotonic, itaconic and fumaric acids and the like. It should be recognized that the halogenated resins containing halogens other than chlorine, e.g., bromine, fluorine and iodine, are also operable in this invention. Said halogenated resins may contain a varying proportion of halogen, depending upon the nature of the resin and its contemplated use. Those copolymers in which a predominant portion, i.e., more than 50% by weight of the copolymer, is made from a halogen-containing vinylidene monomer such as vinyl chloride represent a preferred class of polymers to be treated according to this invention.

The esters of tricyclo-(4,2,2,0$^{2,5}$)-dec-7-ene-3,4,9,10-tetracarboxylic acid dianhydride useful as plasticizers with this invention have the general formula

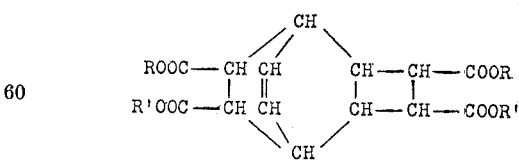

wherein R and R' are like or unlike radicals selected from the group consisting of alkyl having 1 to 20 carbon atoms, mixed alkyl having 6 to 12 carbon atoms, cycloalkyl having 4 to 18 carbon atoms, aryl having 6 to 10 carbon atoms and aralkyl having 7 to 9 carbon atoms.

The alkyl and cycloalkyl radicals can be derived from many sources. For example, the alkyl radicals can be straight or branched chain radicals having up to 20 carbon atoms derived from various sources such as alcohols, including alcohols produced by the oxo synthesis or alcohols obtained by catalytic hydrogenation of coconut oil, from oxidized waxes or from esterification of a carbonyl group by reaction with an olefin. Illustrative examples of alkyl radicals are methyl, ethyl, propyl, isopropyl, n-butyl, isobutyl, sec.-butyl, tert.-butyl, n-amyl, isoamyl, n-hexyl, isohexyl, 2-ethylheptyl, 2-ethylhexyl, octyl, isooctyl, 2-octyl, isononyl, decyl, lauryl, tetradecyl, pentadecyl, octadecyl, allyl, crotyl, oleyl, alkyl radicals derived by $C_3$ to $C_{20}$ oxo alcohols, etc. Illustrative examples of cycloalkyl radicals are cyclobutyl, cyclopentyl, 2-methylcyclopentyl, 3-methylcyclopentyl, 2,4-dimethylcyclopentyl, cyclohexyl, 3,5-dimethylcyclohexyl, gem.-dimethylcyclohexyl, cyclohexylmethyl, cyclohexylpropyl, methylcyclohexylethyl, 2-propylcyclohexyl, 3-dodecylcyclohexyl, cycloheptyl, 2,4-dimethylcycloheptyl, 2,3,5- trimethylcycloheptyl, etc. Illustrative examples of aryl radicals are phenyl, nephthyl, etc. Illustrative examples of aralkyl radicals are benzyl, 4-methylbenzyl, 3-phenylpropyl, phenethyl, etc.

The mixed alkyl radicals can be derived from mixtures of straight chain aliphatic alcohols having between 6 and about 18 carbon atoms. These are represented by the alcohols marketed by Continental Oil Company under the tradename Alfol 610, Alfol 810, Alfol 1214, Alfol 1216 and Alfol 1618 and alcohols marketed by Archer Daniels Midland Company under the tradename Adol 9, Adol 12, Adol 52 and Adol 63. Alfol 610 is a mixture of saturated straight chain hydrocarbon monohydric alcohols having the following approximate composition: 20% $C_6$ alcohols, 35% $C_8$ alcohols and 44% $C_{10}$ alcohols. Alfol 810 consists primarily of 43% $C_8$ alcohols and 55% $C_{10}$ alcohols. Alfol 1214 comprises approximately 55% $C_{12}$ alcohols and 43% $C_{14}$ alcohols. Alfol 1216 has a composition approximating 63% $C_{12}$ alcohols, 24% $C_{14}$ alcohols, 63% $C_{16}$ alcohols, 30% $C_{18}$ alcohols and 2% $C_{20}$ alcohols. Adol 9 is a mixture of straight chain fatty alcohols having the following approximate composition: 55% $C_8$ alcohols, 35% $C_{10}$ alcohols, and 10% $C_{12}$ alcohols. Adol 12 consists primarily of 2% $C_{10}$ alcohols, 90% $C_{12}$ alcohols and 8% $C_{14}$ alcohols. Adol 52 has an approximate composition of 4% $C_{14}$ alcohols, 90% $C_{16}$ alcohols and 6% $C_{18}$ alcohols. Adol 63 comprises 1% $C_{12}$ alcohols, 6% $C_{14}$ alcohols, 30% $C_{16}$ alcohols, 60% $C_{18}$ alcohols and 3% $C_{22}$ alcohols.

The esters of this invention are readily prepared by reacting tricyclo-$(4,2,2,0^{2,5})$-dec-7-ene-3,4,9,10-tetracarboxylic acid dianhydride and an alcohol in the presence of an esterification catalyst. The esters can also be readily prepared by reacting tricyclo-$(4,2,2,0^{2,5})$-dec-7-ene-tetracarboxylic acid dianhydride with an alcohol and a benzyl halide in the presence of a tertiary amine.

The tricyclo-$(4,2,2,0^{2,5})$-dec-7-ene-3,4,9,10-tetracarboxylic acid dianhydride useful in preparing the compounds of this invention is readily prepared by reacting benzene and maleic anhydride in the presence of ultraviolet radiation as disclosed in British patent specification No. 986,348.

The invention will be more readily understood by reference to the following examples which describe the advantageous and unexpected results achieved by the use of the esters of the present invention in thermoplastic resins. There are, of course, many other forms of this invention which will become obvious to one skilled in the art, once the invention has been fully disclosed, and it will accordingly be recognized that these examples are given for the purpose of illustration only, and are not to be construed as limiting the scope of this invention in any way.

The following testing procedures are used in evaluating the physical properties and efficiency of plasticizers.

Compatibility.—Visual inspection of the plasticized composition is employed, incompatibility of the plasticizer with the polymer being demonstrated by cloudiness and exudation of the plasticizer.

Low-temperature flexibility.—Low-temperature flexibility is one of the most important properties of elastomeric vinyl compositions. While many plasticizers will produce flexible compositions at room temperature, the flexibility of these compositions at low temperature may vary considerably, i.e., plasticized polyvinyl chloride compositions that are flexible at room temperature often become very brittle and useless at lower temperatures. Low-temperature flexibility tests herein employed are according to the Clash-Berg Method. This method determines the torsional flexibility of a plastic at various temperatures. The temperature at which the vinyl composition exhibits an arbitrarily established minimum flexibility is defined as the low-temperature flexibility of the composition. This value may also be defined as the lower temperature limit of the plasticized compositions usefulness as an elastomer.

Volatility.—Just as a decrease in temperature often results in decreased flexibility of a plasticized polymer composition, so does a decrease in plasticizer concentration when caused by volatilization of the plasticizer. Hence, plasticizers which are readily volatilized from the plasticized composition as a result of ageing or heating are inefficient because, upon volatilization, the plasticized compositions become stiff and hard. The test for plasticizer volatility herein employed is that described by the American Society for Testing Materials under the designation D-1203-55T.

Water Resistance.—The amount of water absorption and the amount of water leaching that take place when the plasticized composition is immersed in distilled water for 24 hours is determined.

Hardness.—A standard instrument made by Shore Instrument Company is used for this determination and expresses the hardness in units from 1 to 100. The hardness of the composition is judged by its resistance to the penetration of a standard needle applied to the composition under a standard load for a standard length of time.

The following examples illustrate the advantageous and unexpected results which are achieved by the use of the esters of the present invention in thermoplastic resinous compositions but it is not intended that this invention be limited by or to such examples.

EXAMPLE 1

One hundred parts by weight of polyvinyl chloride and 40 parts by weight of tetra-2-ethylhexyl tricyclo-$(4,2,2,0^{2,5})$-dec-7-ene-3,4,9,10-tetracarboxylate are mixed on a rolling mill to a homogeneous blend. During the milling, substantially no fuming or discoloration is observed. Testing of the molded sheet for low-temperature flexibility, according to the procedure described above, gives a value of $-18.9°$ C., which value denotes good low-temperature properties. A test of the volatility characteristics of the composition gives a value of 4.5%. Tests of the water resistance of the plasticized material show a loss of soluble matter of 0.06% and a water absorption value of 0.82%. A Shore hardness value of 83 is obtained on this composition.

EXAMPLE 2

Following the procedure of Example 1, the tetra-2-ethylhexyl tricyclo-$(4,2,2,0^{2,5})$-dec-7-ene-3,4,9,10-tetracarboxylate plasticizer is replaced with 40 parts by weight of the following plasticizers:

Tetramethyl tricyclo-$(4,2,2,0^{2,5})$-dec-7-ene-3,4,9,10-tetracarboxylate

Tetra($C_6$–$C_{10}$ alkyl) tricyclo-$(4,2,2,0^{2,5})$-dec-7-ene-3,4,9,10-tetracarboxylate Tetracyclohexyl tricyclo-$(4,2,2,0^{2,5})$-dec-7-ene-3,4,9,10-tetracarboxylate Tetra-n-butyl tricyclo-(4,2,2,0$^{2,5}$)-dec-7-ene-3,4,9,10-tetracarboxylate Tetra-isohexyl tricyclo-(4,2,2,0$^{2,5}$)-dec-7-ene-3,4,9,10-tetracarboxylate Tetra-n-octyl tricyclo-(4,2,2,0$^{2,5}$)-dec-7-ene-3,4,9,10-tetracarboxylate Tetraphenyl tricyclo-(4,2,2,0$^{2,5}$)-dec-7-ene-3,4,9,10-tetracarboxylate Tetrabenzyl tricyclo-(4,2,2,0$^{2,5}$)-dec-7-ene-3,4,9,10-tetracarboxylate Dipropyl dibenzyl tricyclo-(4,2,2,0$^{2,5}$)-dec-7-ene-3,4,9,10-tetracarboxylate Di-2-ethylhexyl diphenyl tricyclo-(4,2,2,0$^{2,5}$)-dec-7-ene-3,4,9,10-tetracarboxylate Diamyl dicyclobutyl tricyclo-(4,2,2,0$^{2,5}$)-dec-7-ene-3,4,9,10-tetracarboxylate The plasticized resin compositions exhibit physical properties similar to those demonstrated in Example 1.

Similar results are obtained when the above esters are compared at 20, 30, 60 and 75 phr. (parts of plasticizer per hundred parts by weight of resin) level.

On substituting other vinyl halide-containing resins for the polyvinyl chloride used in the foregoing examples, it is found that effective plasticization results are also obtained with such other resins, numerous examples of which are well known to those skilled in the art and have been heretofore described. Results similar to those obtained in the foregoing examples are also obtained when the polyvinyl chloride is replaced by an equivalent amount of a copolymer of 95 parts of vinyl chloride and 5 parts of vinyl acetate, a copolymer of 90 parts of vinyl chloride and 10 parts of vinylidene chloride, a copolymer of 70 parts of vinyl chloride and 30 parts of diethyl-maleate, etc.

EXAMPLE 3

The procedure of Example 1 was repeated but substiuting 100 parts by weight of polymethyl acrylate and 100 parts by weight of polymethyl methacrylate in lieu of polyvinyl chloride. In each instance, the results paralleled those obtained in the first example.

EXAMPLE 4

Samples of cellulose acetate, cellulose propionate and ethyl cellulose are mixed on a rolling mill to a homogeneous blend with 40 parts by weight of dibutyl dibenzyl tricyclo-(4,2,2,0$^{2,5}$)-dec-7-ene - 3,4,9,10-tetracarboxylate per 100 parts by weight of each thermoplastic resin. The resultant products are pressed into films and are found to be more flexible than films obtained from the thermoplastic resins in the absence of the ester plasticizer.

EXAMPLE 5

The procedure of Example 1 was repeated except that the polyvinyl chloride was replaced by 100 parts by weight of several resins, namely, polyethylene, polypropylene, polyvinyl acetate and polystyrene. In each instance, the plasticized resin compositions exhibit physical properties comparable to those demonstrated in the preveious examples.

For many purposes, it may be desirable to blend other conventional additives with the plasticized thermoplastic resinous compositions of the present invention. Illustrative of such additives are fillers, dyes, pigments, heat and light stabilizers, lubricants and the like. It will be apparent that compositions containing such other additives are within the scope of this invention.

While this invention has been described with respect to certain embodiments, it is not so limited, and it should be understood that variations and modifications thereof may be made which are obvious to those skilled in the art without departing from the spirit or scope of the invention.

The embodiments of the invention in which an exclusive property or privilege is claimed are defined as follows:

1. A composition of matter comprising a thermoplastic resin and an ester having the general formula,

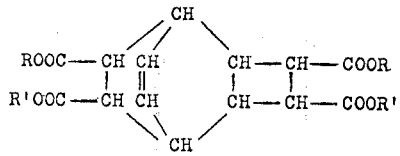

where R and R' are like or unlike radicals selected from the group consisting of alkyl having 1 to 20 carbon atoms, mixed alkyl having 6 to 12 carbon atoms, cycloalkyl having 4 to 18 carbon atoms, aryl having 6 to 10 carbon atoms and aralkyl having 7 to 9 carbon atoms, wherein said ester is present in amounts of from about 5 to about 200 parts by weight per 100 parts by weight of thermoplastic resin.

2. A composition as defined in claim 1 wherein the ester is present in amounts of from about 20 to about 100 parts by weight per 100 parts by weight of the thermoplastic resin.

3. A composition as defined in claim 1 wherein the thermoplastic resin is a vinyl halide polymer selected from the group consisting of polymerized vinyl halide monomers and the copolymers of such monomers with an ethylenically unsaturated monomer, at least 50% of the monomer units of said copolymers being vinyl halide units.

4. A composition as defined in claim 1 wherein the thermoplastic resin is polyvinyl chloride.

5. A composition as defined in claim 1 wherein the thermoplastic resin is a polymer of an α-monoolefin having 2 to 10 carbon atoms.

6. A composition as defined in claim 1 wherein the thermoplastic resin is a cellulose ester of an organic acid having 2 to 4 carbon atoms.

7. A composition as defined in claim 1 wherein the thermoplastic resin is a polymer of methyl methacrylate selected from the group consisting of homopolymers of methyl methacrylate and copolymers of methyl methacrylate containing at least 75% methyl methacrylate and up to 25% of an ethylenically unsaturated monomer copolymerizable therewith.

8. A composition as defined in claim 1 wherein the thermoplastic resin is polymethyl methacrylate.

9. A composition as defined in claim 1 wherein the ester is tetra-2-ethylhexyl tricyclo-(4,2,2,0$^{2,5}$)-dec-7-ene-3,4,9,10-tetracarboxylate.

References Cited

UNITED STATES PATENTS 2,940,984   6/1960   Applequist et al. _____ 260—468
3,048,558   8/1962   Dazzi.

MORRIS LIEBMAN, *Primary Examiner.*

L. T. JACOBS, *Assistant Examiner.*

U.S. Cl. X.R.

260—468